March 8, 1938.  A. T. SMITH  2,110,559
ELECTRIC BROILING APPLIANCE
Filed Jan. 9, 1937  6 Sheets-Sheet 1

Inventor
A. T. Smith
By
Attorneys

March 8, 1938. A. T. SMITH 2,110,559
ELECTRIC BROILING APPLIANCE
Filed Jan. 9, 1937 6 Sheets-Sheet 3

Inventor
A. T. Smith
By
Attorneys

March 8, 1938. A. T. SMITH 2,110,559
ELECTRIC BROILING APPLIANCE
Filed Jan. 9, 1937 6 Sheets-Sheet 4

Inventor
A. T. Smith
By
Attorneys

March 8, 1938.　　　　A. T. SMITH　　　　2,110,559
ELECTRIC BROILING APPLIANCE
Filed Jan. 9, 1937　　　　6 Sheets-Sheet 5
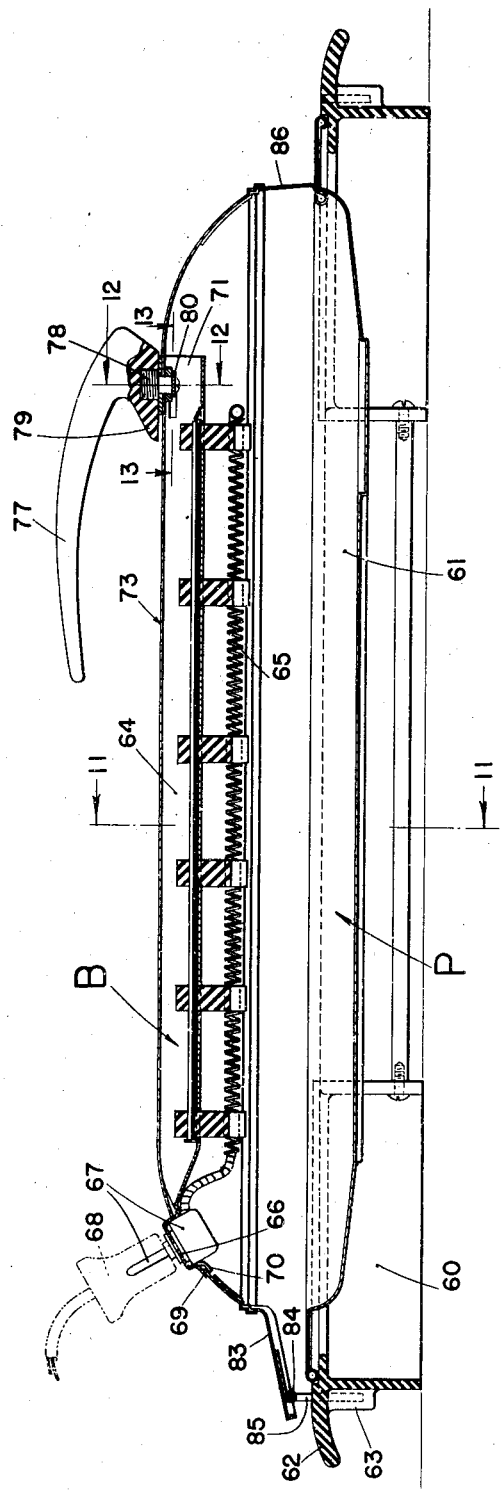
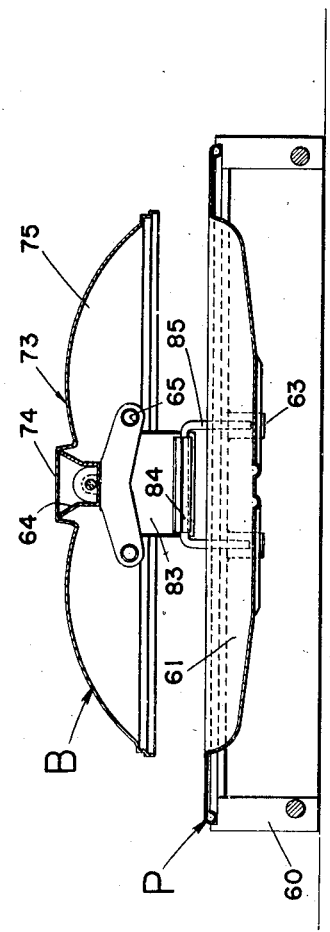
INVENTOR
ALVA T. SMITH
BY
ATTORNEYS

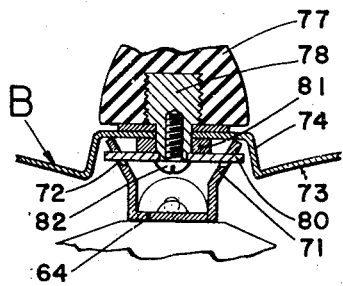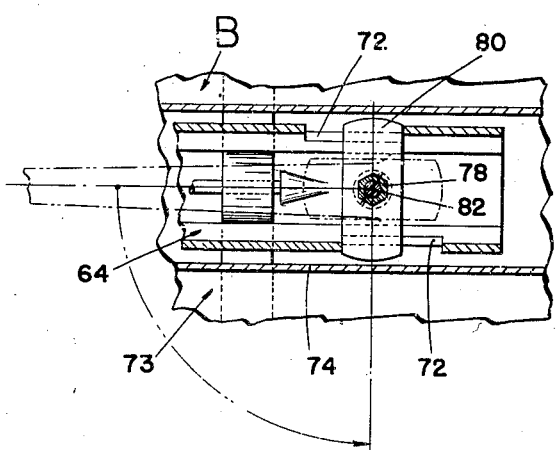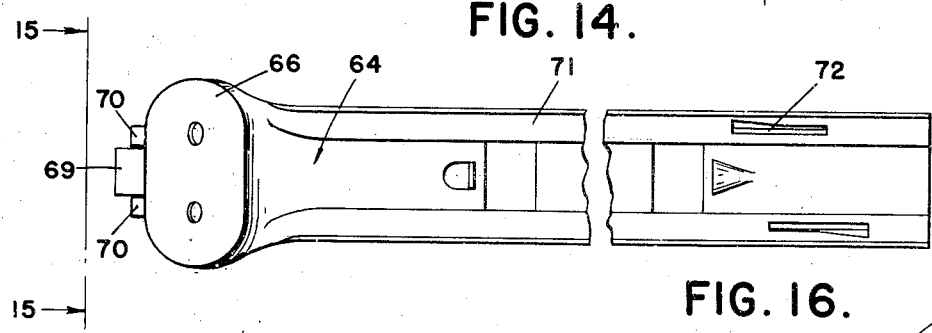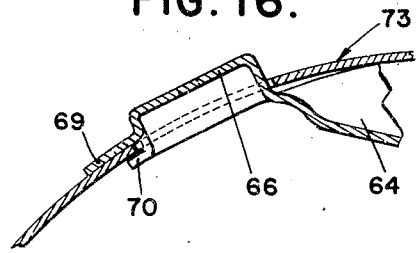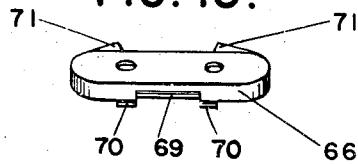

Patented Mar. 8, 1938

2,110,559

UNITED STATES PATENT OFFICE 2,110,559

ELECTRIC BROILING APPLIANCE

Alva T. Smith, Milwaukee, Wis., assignor to National Enameling and Stamping Company, Milwaukee, Wis.

Application January 9, 1937, Serial No. 119,842

15 Claims. (Cl. 219—19)

REISSUED
OCT 7 - 1941

This invention appertains to broilers, and more particularly to an electric broiling attachment for a serving platter or a cooking device, such as an electric roaster.

One of the primary objects of my invention is to provide a broiler attachment, which can be associated with a food-receiving member or a cooking device of ordinary form in such a manner that not only will the food be broiled in an appetizing manner, but smoking and spattering will be reduced to a minimum.

Another object of the invention is to provide an electric broiling device, which allows a thorough ventilation of the appliance, so that escape of steam and the like is permitted, whereby radiant heat is utilized to bring about the searing of the food without baking or steaming, and whereby the food will be broiled similar to food broiled over an open camp fire.

Another salient object of the invention is to provide an electric broiling device in which the food is visible during the broiling process, whereby the food can be turned and removed from the broiler at the desired advantageous time.

Another salient object of the invention is to provide novel means for supporting the reflector and the searing electrical unit, whereby the reflector and unit can be quickly swung back to an inoperative out-of-the-way position to permit the convenient placing, turning, and removal of the meats and the like from the platter or cooking rack shelf, as the case may be.

A further object of the invention is to provide a novel reflector of such a shape that the heat rays rising from the top of the resistance coils are reflected down on the surface of the meat near its outer edge, where the direct rays from the coils are beginning to diminish in intensity, so that an even distribution of heat over the entire broiling area is obtained.

A further important object of the invention is to provide an electric broiling attachment embodying a novel reflector, an electric resistance unit extending longitudinally thereof, and novel supports for the reflector and unit, whereby the same can be conveniently associated with a roaster and supported in the desired manner thereon, both in its operative broiling position and its inoperative meat-handling position.

A further salient object of the invention is to provide a novel handle for the swinging or free end of the reflector and heating unit, whereby the same can be conveniently manipulated, the handle forming means for engaging one end of the roaster for supporting the reflector and its heating unit at its free end.

A still further object of the invention is to provide novel means for detachably associating the reflector with the heating unit, whereby the reflector can be quickly and conveniently removed from the heating unit to allow the thorough and easy cleaning of the reflector.

A still further object of the invention is to provide a novel and convenient means for associating the electric resistance coil with the center rib of the broiler, whereby the assembling of the device is facilitated, the center rib forming the means for supporting the reflector.

A still further important object of the invention is to provide novel means for hingedly connecting the reflector and heating unit with the supporting wire foot, the foot being formed in a novel manner for engaging the roaster pan and the broiling rack positioned in said pan.

With these and other objects in view, the invention consists in the novel construction, arrangement, and formation of parts, as will be hereinafter more specifically described, claimed, and illustrated in the accompanying drawings, in which drawings:

Figure 10 is a central longitudinal section through a slightly modified form of the broiling appliance, showing the same associated with a serving or sizzling platter.

Figure 11 is a transverse section through the same, taken substantially on the line 11—11 of Figure 10, looking in the direction of the arrows.

Figure 12 is an enlarged, fragmentary, vertical sectional view taken substantially on the line 12—12 of Figure 10, looking in the direction of the arrows, illustrating the operating handle and the novel locking means carried thereby for detachably connecting the reflector and center rib together.

Figure 13 is a detail, horizontal, sectional view taken substantially on the line 13—13 of Figure 10, looking in the direction of the arrows, illustrating the locking means for connecting the reflector and center rib together.

Figure 14 is a bottom plan view of the center rib with all associate parts removed.

Figure 15 is a fragmentary, detail inner end elevation of the center rib.

Figure 16 is an enlarged, detail, longitudinal sectional view illustrating the means for detachably associating the end of the rib remote from the handle with the reflector.

Referring to the drawings in detail wherein similar reference characters designate corresponding parts throughout the several views, the letter A generally indicates the novel broiling appliance, and R an electric roaster with which the same can be associated.

Figure 1:
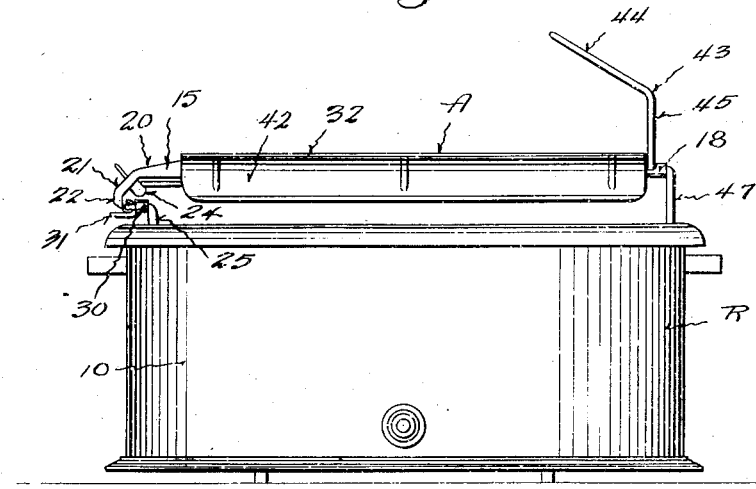
Figure 1 is a side elevation of the novel broiling appliance, showing the same applied to a conventional electric roaster, the appliance being in its operative position.

While the broiling appliance has been shown associated with an electric roaster, it is to be understood that the same can be utilized with other cooking devices, serving platters and the like, although, as shown in Figures 1 to 9 inclusive, the appliance has been primarily designed for use with the roaster.

The roaster R forms no part of the present invention, and is of the type now in general use and known to the trade as "Nesco Roastmaster", and hence the same will not be described in detail.

Briefly, the roaster includes an insulated body 10 having incorporated therein the desired electric resistance units, and these units receive current from any suitable source through a connecting cord and socket which is placed in engagement with a plug or prongs on the roaster (not shown). The roaster body 10 can receive a removable cooking well or receptacle 11, which is normally closed by a removable cover (not shown). The upper end of the receptacle 11 is flanged and shouldered, as at 12, to form a seat for the cover.

The novel broiling appliance A includes a longitudinally extending, centrally disposed rigid rib or backbone member 15. This rigid center rib is preferably formed from sheet metal of the desired gauge, and is of a substantially U-shape in cross-section for the major portion of its length. Thus, the same embodies a flat bottom wall 16 and flaring side walls 17. The outer end of the rib is provided with an extension 18, the side edges of which are folded back, as at 19, in spaced relation to the side walls 17, for a purpose which will be later set forth.

The inner end of the rib 15 is flared outwardly, as at 20, and has formed thereon the depending angularly disposed plate 21 on which is formed the substantially vertically disposed abutment hinge plate 22. The extreme lower edge of the hinge plate 22 is rolled to provide a hinge barrel 23. The angle plate 21 is utilized for the purpose of carrying the electric plug 24, which can be of the two-prong variety for receiving the socket of the connecting cord ordinarily employed for the roaster.

Associated with the outer end of the rigid center rib is the hinge wire or supporting foot 25. This supporting foot or hinge wire includes spaced parallel vertical lengths 26 connected at their lower ends by an offset horizontal length or bar 27. The upper ends of the vertical lengths have formed thereon inwardly directed arcuate arms 28, which are connected by a U-shaped cross-bar 29. The cross-bar is received within the hinge barrel 23, whereby the rib can be swung on the hinge wire or foot 25.

The hinge wire or foot is braced at its point of connection with the rigid center rib by a cross-plate 30. This cross-plate extends in rear of the hinge wire and forms a stop 31 to limit the swinging movement of the center rib on the hinge wire or foot. It will be noted that the foot is disposed in the path of the stop plate 22 of the center rib when the center rib is swung to a raised position.

The center rib is utilized for supporting the novel reflector 32 and the electric resistance searing unit 33. The electric resistance or searing unit 33 includes a coiled resistance wire 34, the ends of which are electrically connected to the terminals of the plug 24. The coiled resistance wire is preferably arranged in spaced parallel longitudinal runs on opposite sides of the rib, and these spaced parallel longitudinal runs are threaded through openings formed in the terminals of porcelain or other insulating blocks 35. These blocks extend transversely across the rigid center rib and have formed thereon upwardly extending lugs 36, which extend through slots 37 formed in the bottom wall of the rib. All of the lugs 36 are provided with longitudinally alined openings, and a holding wire 38 is inserted through the openings in engagement with the upper surface of the bottom wall of the rib.

The rib can have struck out therefrom at one end a lip 39 for limiting longitudinal movement of the wire 38, and the rib adjacent to its other end can have struck out therefrom a bendable tongue 40 for engaging the other end of the wire. This effectively holds the wire 38 in position and the insulating blocks against displacement.

The reflector 32 is preferably formed from sheet metal and can be chromium-plated to give a good reflecting surface and to prevent tarnishing. This reflector extends substantially the full length of the rib and has formed in its longitudinal center a dovetail-shaped guideway 41 to receive the rib. Thus, the reflector can be easily and quickly slid on and off the rib, which allows the convenient and expeditious cleaning of the reflector when necessary or desirable. On each side of the guideway 41 the reflector is provided with longitudinally extending arcuate heat-reflecting wings 42, and these wings form an important feature of the invention, as will be later set forth.

The outer or free end of the rib carries a removable handle 43, which also performs the function of a support for the reflector and rib.

This handle 43 is also preferably constructed from wire and includes a U-shaped hand grip portion 44 terminating in depending parallel arms 45. These arms 45 in turn have formed therein right-angularly extending, horizontal attaching feet portions 46. Extending below and connected with the feet is the depending triangular-shaped bracket portion 47, which is adapted to engage the roaster, as will be later set forth.

By pressing the arms 45 together the attaching feet portion can be snapped under the tongues 19 formed on the outer end of the rib, and this permits the convenient association and rigid connection of the handle with the rib.

In conjunction with the broiler, a broiling rack 50 can be placed within the roaster or other cooking appliance. This rack includes inverted U-shaped end portions or handles 51, the lower ends of which are connected together by longitudinally extending wire strands 52. The longitudinal strands 52 can be braced by transversely extending wires 53.

The end portions or handles 51 carry a series of hooks 54 from any of which the broiling shelf 55 can be suspended. This broiling shelf is also preferably formed from wire, and the end strands thereof can have struck up from the same loops 56 for engaging over the selected pairs of hooks 54. By this arrangement the shelf can be placed in the preferred location relative to the electric resistance element.

Figure 3:
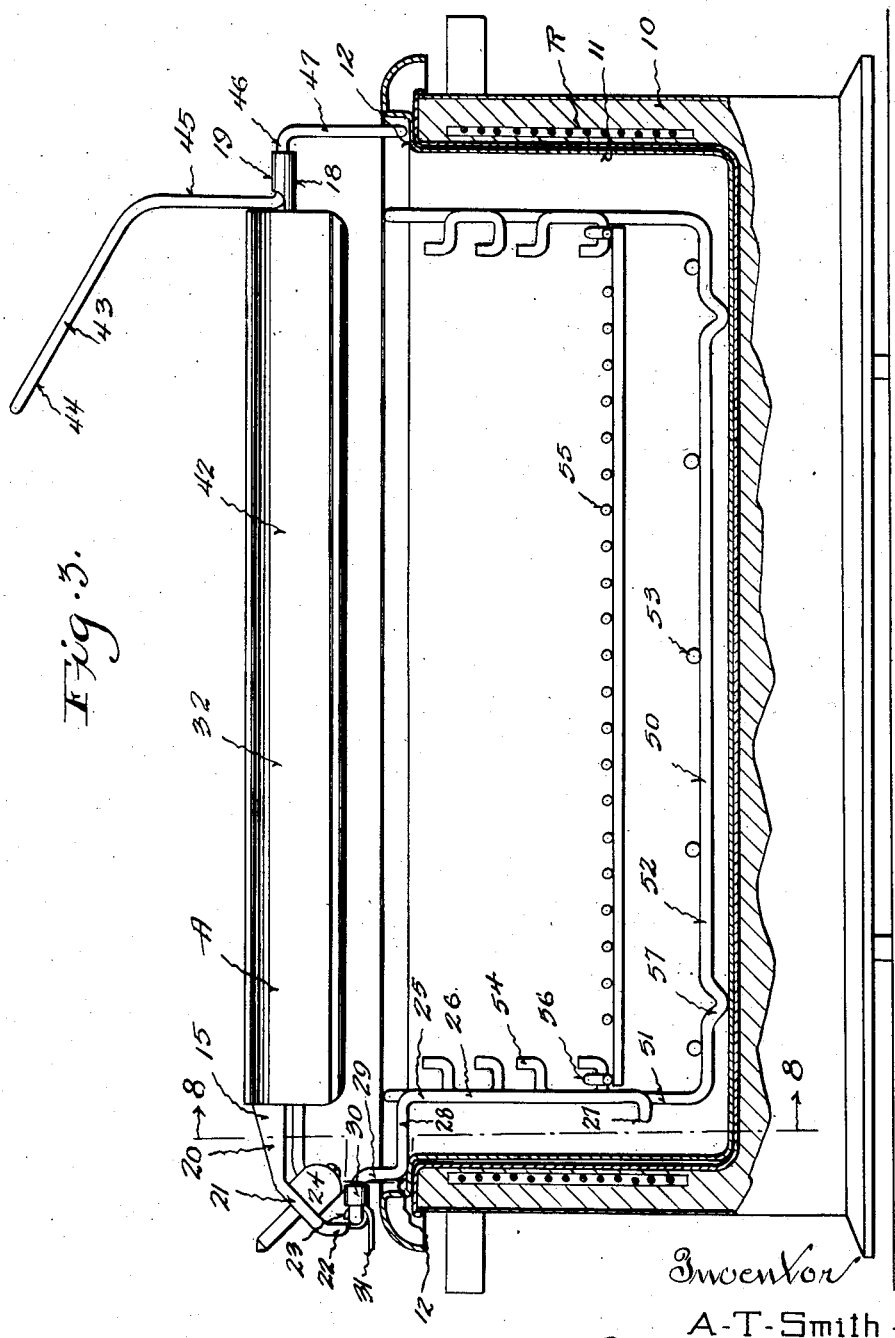
Figure 3 is a side elevation of the broiling attachment, showing the same in its operative position and inserted within a conventional roaster, the roaster being shown partially broken away and in section, the view being on a larger scale than Figures 1 and 2.
Figure 4:
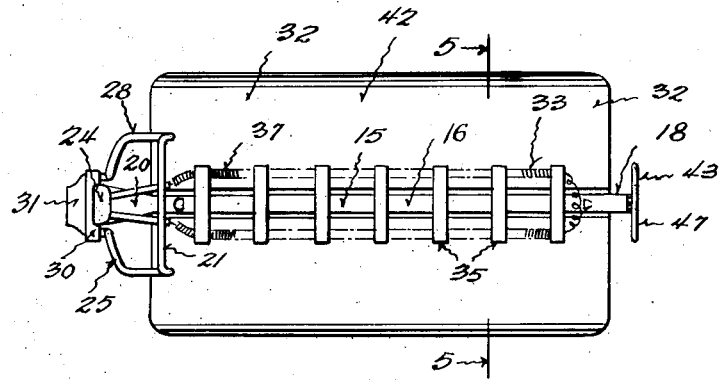
Figure 4 is a bottom plan view of the broiling attachment removed from the roaster, the broiling rack and shelf being also eliminated, the view being substantially on the same scale as Figures 1 and 2.
Figure 5:
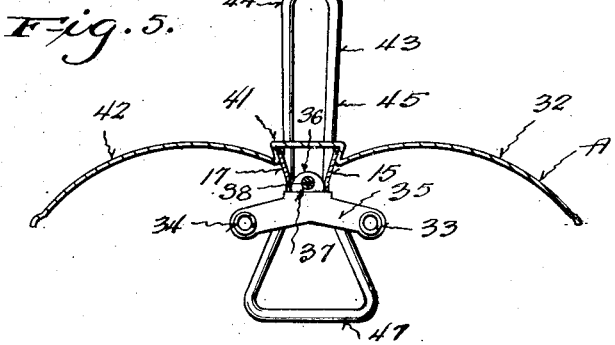
Figure 5 is a transverse section through the reflector and heating unit, taken on the line 5—5 of Figure 4 looking in the direction of the arrows, the view being on a greater scale than Figure 4.
Figure 6:
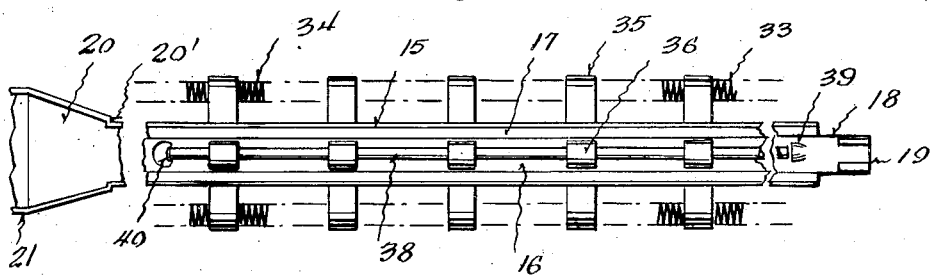
Figure 6 is an enlarged, fragmentary, detail plan view of the heating unit and the rigid center rib, the reflector being removed.
Figure 7:
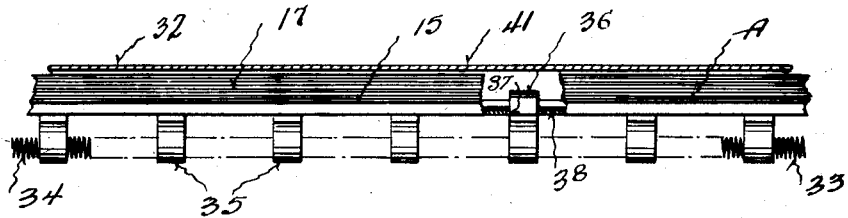
Figure 7 is an enlarged, fragmentary side elevation of the resistance unit and the rigid center rib, the reflector being shown in longitudinal section.
Figure 8:
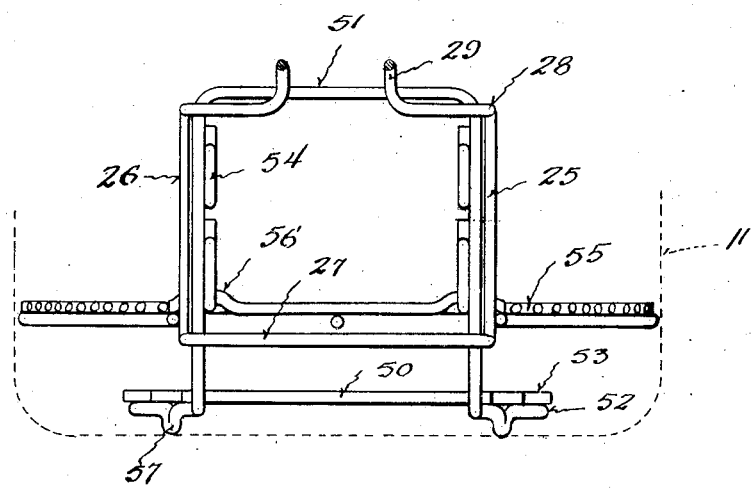
Figure 8 is a section taken substantially on the line 8—8 of Figure 3 looking in the direction of the arrows, showing the broiling rack and shelf in end elevation, the view illustrating the novel connection between the broiling rack and the broiler hinge wire or foot.
Figure 9:
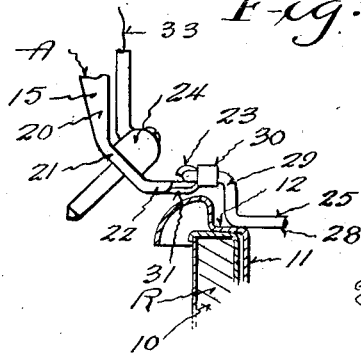
Figure 9 is a detail fragmentary view showing the reflector and resistance unit swung back to its inoperative position.

In use of the improved appliance, the wire rack 50 is placed within the roaster R, as clearly shown in Figures 3 and 8. If preferred, the rack can be provided with downwardly bent legs 57 for engaging the inner pan of the roaster.

The broiling appliance A is now associated with the roaster by inserting the hinge wire or supporting foot 25 within the roaster between one end wall thereof and one end portion of the rack. The side wires 26 of the supporting foot closely engage the side wires of the adjacent end portion of the rack, and the offset part 27 of the foot extends across the adjacent end portion of the rack. The arms 28 of the foot will rest upon the shoulder 12 of the roaster.

Figure 2:
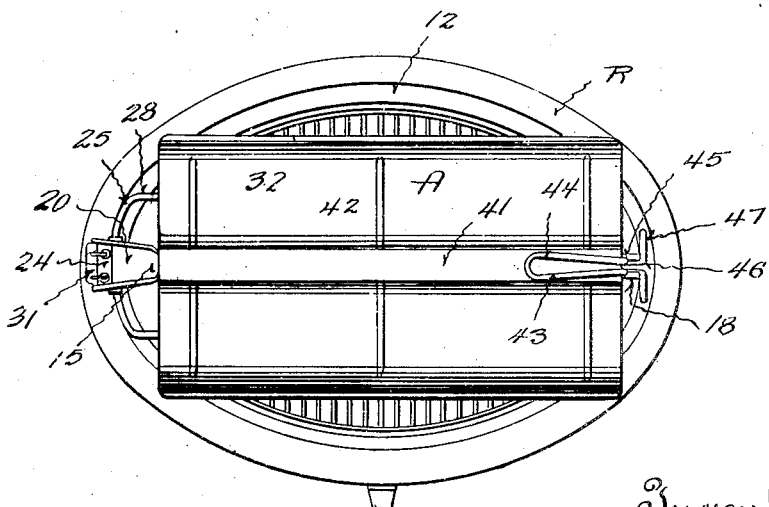
Figure 2 is a top plan view of the broiling appliance, showing the same in its operative position and associated with a conventional roaster.

With the handle 43 connected to the appliance as shown in Figures 1, 2, and 3, the bracket portion 47 thereof will engage the shoulder 12 of the roaster at the opposite end thereof from the arms 28. This effectively holds the heating element or resistance coils 34 and the reflector 32 in the desired proper position relative to the rack and broiling shelf.

Obviously, by grasping the cool grip 44 of the handle 43 the resistance element and reflector can be swung back on the hinge wire to a raised elevated position to permit the placing of the food to be broiled on the rack, the turning of the food, and the removal of the food from the shelf after the desired broiling action has taken place.

When it is desired to clean the broiling appliance the handle 43 can be removed from the rigid center rib 15 by pressing the feet 46 together and sliding the same from under the tongues 19 of the rib, after which the reflector 32 can be slid off said rib. It is to be noted at this point that the insertion of the reflector 32 is limited on the rib by the flared portion 20 thereof, which forms abutment shoulders 20'.

Particular attention is invited to the fact that the resistance coils 34 and the reflector are held in a raised elevated position above the roaster and the broiling rack. This has a particular advantage, namely, it allows the observation of the food being broiled. Thus, the food can be turned exactly at the desired time and removed from the shelf at the correct time.

Likewise, a thorough ventilation of the broiler and roaster is assured, which permits the carrying off of the steam and other objectionable heated air. Thus, the meat or other food is only subjected to direct heat rays, which brings about the proper broiling of the meat or food without stewing or roasting. As steam and the like is carried off, no smoking will be had, and the grease dropping to the bottom of the roaster pan will be cooled, and thus no spattering takes place.

The entire electric broiling appliance closely simulates broiling over an open camp fire in view of the ventilation mentioned above, and thus the food retains its juices and flavor.

The hinge connection between the center rib, which carries the reflector and the heating element with the hinge wire or supporting foot, likewise forms an important feature, in that the reflector and heating element can be swung to the raised inoperative position to permit the handling of the meat. If it were not for this hinge the operator would have to remove the broiler and would not have any place to lay it, and, of course, it would be hot and represent a fire hazard.

As brought out above, the meat or other food is only subjected to the radiant heat from the resistance coils, and the novel shape of the reflector reflects the rays from the top of the coils down around the edges of the meat at the exact point where the direct radiant heat is diminishing in temperature. Thus, the meat is subjected to an intense even temperature throughout the entire broiling area.

From the foregoing description it can be seen that an exceptionally simple and effective broiling attachment has been provided for electric roasters and other cooking appliances.

In Figures 10 to 16 inclusive I have shown a slightly modified form of my broiling attachment, which is generally indicated by the reference character B. The broiling attachment B is particularly designed for use in connection with a serving or sizzling platter P, but, obviously, the broiling appliance can be effectively used with other similar devices.

As illustrated, the serving or sizzling platter P comprises a supporting base or frame 60, which detachably supports the platter body 61. The ends of the base or frame 60 carry handles 62, which can be provided with sockets 63.

The broiling appliance B includes a longitudinally extending rib 64, which is similar in construction to the rib 15, and this rib supports the electric resistance element 65 in the same manner as the rib 15. The inner end of the rib has formed thereon a cup-shaped member 66 for receiving any preferred type of plug 67, so that an electric appliance cord 68 can be connected with the resistance element 65, it being understood that the resistance element is operatively connected to the plug. The upper outer edge of the cup 66 has formed thereon a lip 69 and downwardly bent ears 70 on opposite sides of the lip. The purpose of the lip 69 and the ears 70 will be later set forth. The end of the rib 64 remote from the cup 66 has formed in the side walls 71 thereof offset cam-shaped slots 72, and the use of these slots will also be later described.

Detachably associated with the rib 64 is the reflector 73, and the same is provided with a longitudinally extending center channel 74 for receiving the upper edges of the side walls 71 of the rib. The reflector, in this instance, is in the shape of an oval cover, but it is to be noted that the same includes arcuate heat-reflecting sides or wings 75.

The inner end of the cover has formed therein an opening 76, through which the cup 66 is adapted to protrude. By placing the rib at an angle to the reflector, the lip 69 can be placed through the opening 76 and on the upper surface of the reflector, and when the rib is swung to a horizontal position the upper edges of the rib will ride into the central channel 74 of the reflector.

Means is provided for detachably locking the end of the rib remote from the cup 66 to the reflector. In the present instance, this means includes the handle 77 for the reflector. The handle can be formed from composition or any other desired material, and has anchored in its lower face a depending stud 78, which is adapted to extend through the reflector. A bearing washer 79 is placed on the stud between the handle and the reflector. The lower portion of the stud, which protrudes through the reflector, is preferably of a polygonal shape in cross-section, and has firmly fitted thereon a double-ended latch lever 80. A bearing washer 81 is placed on the stud between the reflector and the latch lever. A screw 82 can be threaded into the stud for holding the latch lever 80 against accidental displacement.

This latch lever extends at right angles to the longitudinal axis of the manipulating handle 77, and the lever is so disposed that when the manipulating handle is turned parallel with the longitudinal center of the reflector, the ends of the latch lever will ride into the cam slots 72 and firmly lock the reflector and rib together. By turning the handle 77 at right angles to the longitudinal center of the reflector, the ends of the latch lever will ride out of the slots, and thus permit the swinging down of the rib relative to the reflector, so that the reflector and rib can be separated.

A bracket 83 is rigidly secured to the reflector adjacent to the opening 76, and this bracket extends outwardly from the reflector, and has secured thereto or formed thereon a hinge barrel 84 for receiving a U-shaped supporting bracket 85. The legs of the bracket 85 are adapted to be detachably fitted in the sockets 63 of either handle 62 of the serving or sizzling platter.

Obviously, by this arrangement, the broiling appliance B can be swung to an elevated position on the sizzling platter by grasping the handle 77 and lifting up on the reflector. The end of the bracket 83 serves as a stop member for engaging the U-shaped supporting bracket 85 to limit the upward swinging movement of the reflector.

The end of the reflector adjacent to the handle 77 carries a depending bracket or foot 86, which is adapted to engage the serving or sizzling platter P at the end thereof remote from the hinge, whereby both ends of the reflector will be spaced above the platter.

Changes in details may be made without departing from the spirit or the scope of this invention, but what I claim as new is:

1. The combination with a roaster, of an electric broiling attachment therefor and freely removable therefrom comprising, a supporting member for engagement with one end of the roaster, a longitudinally extending rigid center rib, resistance coils carried by said rib, a reflector associated with the rib and overlying the coils, means connecting the rib with the supporting member, and an operating handle carried by the opposite end of the rib having a supporting portion for engaging the opposite end of the roaster remote from the end engaged by the supporting member.

2. The combination with a roaster, of an electrical broiling attachment therefor and freely removable therefrom comprising, a supporting member for engaging one end of the roaster, a rigid center rib, electric resistance coils supported by said rib, a reflector carried by said rib and overlying the coils, means hingedly connecting one end of the rib to the supporting member, an operating handle associated with the opposite end of the rib from the hinge, and means on said handle for engaging the end of the roaster remote from the end engaged by the supporting member.

3. The combination with a roaster, of an electrical broiling attachment therefor and freely removable therefrom comprising, a supporting member for engaging one end of the roaster, a rigid center rib, electric resistance coils supported by said rib, a reflector carried by said rib and overlying the coils, means hingedly connecting one end of the rib to the supporting member, an operating handle associated with the opposite end of the rib from the hinge, means on said handle for engaging the end of the roaster remote from the end engaged by the supporting member, and means for limiting the swinging movement of the rib on the supporting member.

4. The combination with a roaster having a marginal flange, of an electrical broiling appliance therefor and freely removable therefrom comprising, a supporting member for engaging the flange at one end of the roaster, a rigid center supporting rib, resistance coils carried by the rib, a reflector carried by the rib overlying the resistance coils, means hingedly connecting one end of the rib to the supporting member, said supporting member extending above the roaster, whereby the rib, the resistance coils, and the reflector will be positioned above the roaster, an operating handle carried by the outer end of the rib having a supporting bracket thereon for engaging the flange of the roaster at a point remote from the hinge.

5. The combination with a roaster, of an electrical broiling appliance therefor freely removable therefrom including, a supporting rack insertible in said roaster having a series of pairs of supporting hooks at the opposite ends thereof in different planes, a broiling shelf detachably fitted on selected pairs of the hooks, a rigid center rib, electric resistance coils carried by the rib, a reflector carried by the rib, a wire supporting member having depending legs for engaging one end of the rack, and arms for resting upon one end of the roaster, an upstanding portion on the supporting member extending above the roaster, means hingedly connecting one end of the rib to said upstanding portion, and means on the opposite end of the rib for engaging the roaster and for spacing the rib, coils and reflector from the roaster and the broiling shelf.

6. An electrical broiling appliance comprising, a longitudinally extending rigid center rib having a bottom wall and flared side walls, an electric resistance unit depending from and carried by the rib, and a removable reflector associated with said rib having a central dovetail-shaped channel for slidably receiving the flared walls of the rib.

7. A broiling appliance for association with conventional cooking devices comprising, a longitudinally extending rigid center rib, depending transversely extending blocks of insulation carried by the rib, an electric resistance element supported by the blocks, a reflector slidably mounted on the rib overlying the resistance element, one end of said rib being flared to limit the sliding movement of the reflector, an angular portion on the flared end of the rib, a depending transversely extending hinge barrel on said portion, an electric plug carried by said portion operatively connected to the resistance element, a supporting member for the rib including, a depending wire bracket and a transversely extending hinge wire received in said barrel, and co-acting means carried by the hinge wire and the rib for limiting swinging movement of the two relative to one another.

8. An electric broiling appliance for conventional cooking devices comprising, a longitudinally extending center rib having a bottom wall and flared side walls, an electric resistance element carried by and depending from the rib, a reflector comprising a dovetail-shaped channel for slidably receiving the rib and laterally extending arcuate reflecting wings overlying the resistance element, a flared portion on one end of the rib defining stop shoulders for limiting the sliding movement of the reflector on the rib, a supporting member hingedly connected with the mentioned end of the rib, an extension on the other end of the rib having inturned tongues, and a removable operating handle having a hand grip and compressible feet movable under said tongues, and a depending supporting bracket.

9. The combination with a sizzling platter having outwardly extending handles, said handles being provided with sockets, of a broiling attachment for the platter comprising an inverted U-shaped supporting bracket detachably fitted in the sockets of either handle, a reflector, means hingedly connecting one end of the reflector to the supporting bracket, a depending spacing foot on the other end of the reflector for engaging the platter, and an electric resistance element carried by and arranged within the reflector.

10. The combination with a sizzling platter having outwardly extending handles, said handles being provided with sockets, of a broiling attachment for the platter comprising an inverted U-shaped supporting bracket detachably fitted in the sockets of either handle, a reflector, means hingedly connecting one end of the reflector to the supporting bracket, a depending spacing foot on the other end of the reflector for engaging the platter, an electric resistance element carried by and arranged within the reflector, and means for limiting the swinging movement of the reflector on the supporting member.

11. In a broiling attachment, a reflector having an opening therein adjacent to the one end thereof, a longitudinally extending rib, electric resistance coils carried by the rib, an electric plug electrically connected with the coils carried by the rib for extension through the opening, said rib having formed therein at one end thereof a lip for engaging the upper surface of the reflector, and ears for engaging the lower surface of the reflector, a manipulating handle rotatably carried by the reflector, said rib having cam-shaped slots therein, and a double-ended latch lever movable with the handle for swinging movement into and out of said slots.

12. The combination with a roaster, of an electrical broiling appliance therefor freely removable therefrom including a supporting rack insertible in said roaster having a broiling shelf, a reflector, an electric resistance element mounted upon the reflector and slightly spaced below the lower surface thereof, a supporting member having means for engaging one end of the rack, arms for resting upon the roaster, an upstanding portion of the supporting member extending above the roaster, means hingedly connecting one end of the reflector to said upstanding portion, and means on the opposite end of the reflector for engaging the roaster and for spacing the resistance element and reflector from the roaster and the broiling shelf.

13. The combination with a roaster, of an electrical broiling appliance therefor freely removable therefrom including, a supporting rack insertible in said roaster having a broiling shelf, a reflector, an electrical resistance element mounted on the lower face of the reflector, a supporting member for engaging the rack and roaster and held in position thereby, means hingedly connecting one end of the reflector to the supporting member, and means on the opposite end of the reflector for engaging the roaster for spacing the reflector and resistance element from the roaster and the broiling shelf.

14. The combination with a roaster, of an electrical broiling appliance therefor freely removable therefrom including, a supporting rack insertible in said roaster having a broiling shelf, a reflector, an electrical resistance element mounted on the lower face of the reflector, a supporting member for engaging the rack and roaster and held in position thereby, means hingedly connecting one end of the reflector to the supporting member, means on the opposite end of the reflector for engaging the roaster for spacing the reflector and resistance element from the roaster and the broiling shelf, and means for limiting the swinging movement of the reflector on the supporting member.

15. The combination with a roaster, of a removable broiling attachment therefor comprising a supporting member adapted to engage one end of the roaster, an electric resistance element, a reflector for said element, means hingedly connecting the reflector and element at one end to the supporting member, an operating handle for the opposite end of the reflector and element, and a depending bracket on said handle for engaging the end of the roaster remote from the end engaged by said supporting member.

ALVA T. SMITH.